US011777985B2

(12) United States Patent
Ben-David (10) Patent No.: US 11,777,985 B2
(45) Date of Patent: Oct. 3, 2023

(54) GRAPH-BASED CLASSIFICATION OF ELEMENTS SUCH AS FILES USING A TOOL SUCH AS VIRUSTOTAL

(71) Applicant: Cybereason Inc., Boston, MA (US)

(72) Inventor: Assaf Ben-David, Tel Aviv (IL)

(73) Assignee: Cybereason Inc., Boston, MA (US)

( * ) Notice: Subject to any disclaimer, the term of this patent is extended or adjusted under 35 U.S.C. 154(b) by 471 days.

(21) Appl. No.: 17/065,362

(22) Filed: Oct. 7, 2020

(65) Prior Publication Data

US 2021/0314332 A1 Oct. 7, 2021

Related U.S. Application Data

(60) Provisional application No. 63/005,621, filed on Apr. 6, 2020.

(51) Int. Cl.
*G06F 16/951* (2019.01)
*G06N 3/08* (2023.01)
(Continued)

(52) U.S. Cl.
CPC ........ *H04L 63/145* (2013.01); *G06F 16/9024* (2019.01); *G06F 16/951* (2019.01); *G06N 3/08* (2013.01); *H04L 63/1416* (2013.01)

(58) Field of Classification Search
CPC . H04L 63/145; H04L 63/1416; G06F 16/951; G06F 16/9024; G06N 3/08
See application file for complete search history.

(56) References Cited

U.S. PATENT DOCUMENTS

| 10,009,358 | B1 * | 6/2018 | Xie | G06F 21/552 |
|---|---|---|---|---|
| 11,122,063 | B2 * | 9/2021 | DiValentin | H04L 63/1416 |
| 2019/0122258 | A1 * | 4/2019 | Bramberger | G06N 3/08 |

OTHER PUBLICATIONS

Gallo et al., "Directed Hypergraphs and Applications", Discrete Applied Mathematics, vol. 42, pp. 177-201 (1993).
(Continued)

*Primary Examiner* — Minh Chau Nguyen
(74) *Attorney, Agent, or Firm* — DLA PIPER LLP (US)

(57) ABSTRACT

A method of determining the level of maliciousness of an element using a directed hypergraph to classify the element based on information aggregated from its locally identified close neighbors, queried in a data base such as VirusTotal (VT). A crawling procedure is used starting from elements needing classification and collecting a set of their neighbors forming neighborhoods. These neighbors are then used to classify the elements. The neural network classifier is able to obtain as input an entire neighborhood. The input includes several feature vectors, one for each element in the neighborhood. In addition, a mapping of interconnections can be provided for each group of elements. Finally, a maliciousness level is provided for the elements in question. For an incriminated file one or more actions can be taken, such as isolating a machine that received the file, killing processes started by the file, removing persistence of the file on the network or affected computer, cleaning infected samples, modifying risk assessment for computer or network, generating a report, collecting additional artifacts, triggering a search for related elements, blocking a user from taking actions and sending information to other IT or security systems. For other element types, some of the above actions are applicable as well. In addition, there are other actions specific to particular element types, e.g. blocking an IP address or a web domain from network access, restricting user authorization, blocking access to an external device, shutting down computers, erasing memory devices, filtering e-mail messages, and many more.

20 Claims, 3 Drawing Sheets

(51) Int. Cl.
 *H04L 9/40* (2022.01)
 *G06F 16/901* (2019.01)

(56) References Cited

OTHER PUBLICATIONS

Hamilton et al., "Inductive Representation Learning on Large Graphs", 31st Conference on Neural Information Processing Systems (NIPS 2017), Long Beach, CA, USA, 19 pages (2017).
Kipf et al., "Semi-Supervised Classification with Graph Convolutional Networks", ICLR 2017, arXiv:1609.02907v3, 13 pages, Nov. 3, 2016.
Schlichtkrull et al., "Modeling Relational Data with Graph Convolutional Networks", arXiv:1703.06103v4, 9 pages, Oct. 16, 2017.

\* cited by examiner

GRAPH-BASED CLASSIFICATION OF ELEMENTS SUCH AS FILES USING A TOOL SUCH AS VIRUSTOTAL

This application is related to, and claims priority from U.S. Provisional Patent Application No. 63/005,621 filed Apr. 6, 2020. Application 63/005,621 is hereby incorporated by reference in its entirety.

BACKGROUND

Field of the Invention

The present invention relates to cyber security and more particularly to graph-based systems of element classification using a tool such as VirusTotal.

Definitions

For the purpose of this document we make the following definitions:
1. Element: Any entity represented by a computer system such as a cyber-security system for the purpose of storing it, referring to it or performing actions on it. Examples related to cyber-security are files, processes, IP addresses, URL addresses, web domains, storage devices, users, user groups, computers, mobile devices, network equipment, configuration sets, logs, databases, e-mail addresses, e-mail messages and organizational departments.
2. Maliciousness: Level: Any property of an element which a computer system can be tasked to infer. It can be unknown or already known (from some source) prior to inference; it can have a factually correct value or represent an opinion or estimation; and its value can be continuous, discrete or a combination of both. Examples related to cyber-security are whether a file is malicious or benign, the level of trust associated with a web domain, the probability of a machine to be infected by a malicious software, the application type of an executable file and association between users and the computers they use.
3. Classification: We extend the standard definition of 'classification' to also include regression analysis, specifically in its use for prediction and forecasting of continuous quantities in e.g. the field of machine learning,[1] as well as any combination of the two. Accordingly, whether the property which the system is tasked with inferring is continuous or discrete, we refer to, e.g., the act of inference as "classification" (to also include "regression"), the inferring system as a "classifier" (to also include "regressor"), the resulting inferred quantity as a "class", etc.
[1] See https://en.wikipedia.org/wiki/Regression_analysis [Oct. 6, 2020]

DESCRIPTION OF THE PROBLEM SOLVED

Introduction

The prior art tool VirusTotal[2] (VT) can be regarded as a vast data-base containing security-related information. As this resource is constantly being updated by many parties across the globe, it is considered a quality source for security data, regarding both malicious and benign samples. It contains four main kinds of elements—files, domains, IP addresses and URL web addresses— as well as the connections between them.
[2] http://www.virustotal.com/

The Cybereason[3] security platform collects (relevant) data from the user's end-point computer and analyzes them on a central server. As part of this analysis, it queries VT for e.g. the image file of every process it encounters. This lets the system know whether the file is already known to the community, and if so, what its reputation is. If the file is unknown to VT, other methods must be utilized in order to assess whether it is malicious. In this work, we discuss one such method.
[3] http://www.cybereason.com/

When an element is unknown to VT, we obviously lack direct community reputation for it. However, in certain situations, we might still be able obtain indirect information relating to it from VT, and use that in order to estimate its maliciousness level. This can be done when the Cybereason platform 'detects connections between the element and other elements, its neighbors. If some of the neighbors are known in VT, we can use their VT records to indirectly classify the element itself.

VirusTotal

The VT data-base contains information on mainly four element kinds. Each element has various fields, from which features can be extracted. In addition, elements can be connected to other elements. The four VT element kinds are:
File: These elements contain both static information on the file itself and dynamic information describing the behavior of processes running when the file is invoked. Static data include for example file size, file type, signature information and entropy, while dynamic data include connections to other elements (e.g. resolved domains, TCP/UDP connections and execution parents). This element kind also contains the scan results of the various anti-virus engines incorporated into VT.
Domain: These elements contain, for example, the WHOIS report, as well as information aggregated from other services such as Alexa or Web of Trust. They also contain connections to other elements, e.g. in the forms of domain siblings, subdomains, IP resolutions, communicating files and URLs.
IP: These elements contain, in addition to information such as autonomous system number and registration country, connections to other elements via e.g. domain resolutions, communicating files and URLs.
URL: These elements, like file elements, contain the scan results of various external engines. In addition, several external services provide categorization of the URL content. Examples of connections to other elements are the IP resolutions and the domain hosting the page.

We can see that these elements connect with each other via several types of relations. Each element kind has its own possible relations to other kinds. In addition, there are examples where a pair of element kinds has several different relations connecting between them. As detailed below, such complex relations can be best represented using an extension of a graph.

Cybereason

The Cybereason sensors collect system-level data that is useful in the detection of a cyber attack. Types of data collected include, for example:
Process information: Including process type, process name, the par-ent/child processes, memory usage, session ID, network connections, owner name, privileges, security context, and start and end time.

File information: Including information related to the file's full path, file attributes, file size, creation and modification date, versions, reputation information, and file hash.

Connections information: Including local IP address and port, remote IP address and port, transport protocol, transmitted or received bytes, and start and end time.

As we can see, the elements are similar to those of VT, and again can be represented by an extension of a graph. This should not come as a surprise, as the two systems try to describe similar content domains.

This allows us to translate the Cybereason representation to that of VT: Each process has features of its own and features describing the file associated with it. In addition, using the information collected on the connections opened by the process, we can connect neighbors to each process (e.g. resolved domains, IP connections using TCP or UDP, or even the execution parent file), in much the same way as in VT.

Within this context, two important aspects of graph-based inference need to be mentioned. First, graph relations are inherently unordered, e.g. the resolved IP addresses of a domain have no intrinsic ordering. This proves to be a challenge for most algorithms, and in particular ones based on neural networks, which typically require a clear and structured order for processing input.

Secondly, the common practice for propagating information along the graph involves making iterative inferences about intermediate elements. This, however, has an inherent significant drawback: Since the structure of the graph can be quite complex, any single element can participate in the inference of more than a single target element. Moreover, when used for classification of different target elements, each intermediate element can play a different role or appear in a different context. Committing to a class for each intermediate element then using that same class for classification in different contexts can cause errors, which then propagate as the network is traversed. This is especially important for cyber-security purposes, where an element is often not inherently "good" or "bad", but instead should be considered in the context of a bigger picture.

For example, consider a case of two file elements undergoing classification and a certain web domain. One file was downloaded from the domain, while the other was observed communicating with it. The same domain element therefore serves in a different role relative to each file element. Similarly, an element can be a close neighbor to one target element and a far neighbor to another, can have few or many graph paths leading to the target element, etc.

One way to mitigate the problem is to classify a single element at a time while reclassifying intermediate elements each time, in each context. This, however, is not very efficient and does not take full advantage of the complexity of a true graph structure. A more efficient approach is to avoid classifying intermediate elements altogether and instead use them in a flexible manner which is context-aware. This allows the classification of several elements simultaneously a much more versatile and efficient approach while also avoiding the introduction of errors such 'hard' intermediate classifications can cause.

Overcoming these two challenges is crucial for an effective cyber-security graph-based learning system.

SUMMARY OF THE INVENTION

The present invention uses a directed hypergraph to classify an element based on information aggregated from its close neighbors in the graph. A crawling procedure is used starting from elements needing classification and collecting a set of their neighbors forming a neighborhood. An example use of the present invention in the Cybereason platform is when the system encounters an element known or unknown to VT, and also detects connections from it to other elements which are found in VT. These neighbors are then used to classify the element. This classifier is able to obtain as input an entire neighborhood. This input is much richer than prior art feature vector approaches. Here, the input includes several feature vectors, one for each element in the neighborhood. In addition, a mapping of interconnections can be provided for each group of elements.

It is an object of the present invention to utilize network (graph) analysis to determine the maliciousness level of elements for the purpose of cyber-security.

It is a further object of the present invention to use observed properties of elements to indirectly deduce information about them from a cyber-security data-base (such as VT), even when the element in question is not present in the data-base.

Finally, it is an object of the present invention to provide incrimination of an element based on its connections to neighbors without a classification of these neighbors.

DESCRIPTION OF THE INVENTION

The Directed Hypergraph

We saw that, for our purposes, we can think of both VT and the Cybereason platform as containing information regarding the same kinds of elements, having the same connections (albeit may be having different features). It is only natural to represent these elements as a directed graph. However, in our case an element can connect to multiple neighbors using the same connection. Therefore, a more suitable structure in this case is in fact a directed hypergraph.

We follow [1] when defining our directed hypergraph and broaden the definition to also generalize a directed multidigraph, or a quiver. We define a directed multi-hypergraph as an ordered tuple $G=(\mathcal{V}, \varepsilon, s, t, w)$, where $\mathcal{V}$ is a set of vertices (or nodes, or elements) and $\varepsilon$ a set of directed hyperedges (or simply edges). The function $s:\varepsilon \to \mathcal{V}$ assigns to each edge a source node, and the function $t:\varepsilon \to 2^{\mathcal{V}} \setminus \{\emptyset\}$ assigns to each edge a set of target nodes, where $\emptyset$ is the empty set; w is a family of weight functions, providing each edge $e \in \varepsilon$ with a weight function $w_e:t(e) \to \mathbb{R}_{>0}$, where $\mathbb{R}_{>0}$ s the set of positive real numbers. A few remarks on our definitions:

1. We have restricted the definition to allow only a single source node for each edge (what is called in [1] a forward hypergraph or an F-graph). A more general hypergraph allowing multiple source nodes can be represented using our scheme by e.g. replicating each edge according to the number of its sources and assigning each copy to a different source, with the same set of targets.

2. Clearly, when |t(e)|=1 for every e∈ε, the directed multi-hypergraph reduces to a standard (weighted) quiver.

3. In contrast with [1], here we allow edges e for which s(e)∈t(e). In other words, an element can possibly be connected to itself 4. The weights w are included here for the sake of generality. In our example application of VT File classification we do not require them, and set $w_e(v)=1$ for every e∈ε and every v∈t(e).

5. We can also easily use this framework to represent an undirected hypergraph, as a specific case. To do so, for every edge e∈ε we need to include in ε all of its |t(e)| reverse edges e', each satisfying s(e')∈t(e) and t(e')={s(e)}.

In addition to having the structure of a directed hypergraph, our data are also typed and relational, meaning there are different node types (or kinds), each having different features, and relations specifying the allowed connections between them (e.g. hostname is a relation connecting URL elements to Domain elements). To formalize this notion, we add a typing structure to our graph definition. We define a typed and relational version of the hypergraph G as the ordered pair $\mathcal{G}$ =(G, M). The typing structure M=($\mathcal{K}$, $\mathcal{R}$, $\kappa_s$, $\kappa_t$) is a quiver, which we call the meta-graph of G. Its node and edge sets, $\mathcal{R}$ and $\mathcal{R}$, are partitions of $\mathcal{V}$ and ε, respectively, representing the different node kinds and relations. Similarly to $s$ and $t$, the functions $\mathcal{K}_{s,t}:\kappa_s \to \mathcal{R}$ assign to each relation its source and target node kinds, respectively. In order for these definitions to be meaningful, we must also impose some consistency constraints and, for every relation. r∈$\kappa_s$ and every edge e∈r, require that s(e)∈ $\mathcal{R} s$ (r) and t(e)⊆$\mathcal{R} t$ (r). As before, if the hypergraph is undirected, for every relation $r \in \kappa_s$. we need to include in $\kappa_s$. its reverse relation r' satisfying $\mathcal{R} s$ (r')=$\mathcal{R} t$ (r) and $\mathcal{R} t$ (r')=$\mathcal{R} s$ (r).

Armed with a meta-graph, we can declutter the graph somewhat by unifying edges of the same relation having the same source node. Since the hypergraph allows for several target nodes for each edge, there is no benefit in maintaining several edges having the same "role", i.e. belonging to the same relation. Formally, for every r∈$\kappa_s$. and $v \in \mathcal{R} s$ (r) define the plurality set $P_r(v)=\{e\in r | \mathcal{S}(e)=v\}$. if $|P_r(v)|>1$, we remove all the edges in $P_r(v)$ from ε and replace them with a single edge $\bar{e}$ satisfying $$s(\bar{e}) = v, \quad (1)$$

$$t(\bar{e}) = \bigcup_{e \in P_r(v)} t(e),$$

$$\omega_{\bar{e}}(u) = \sum_{\substack{e \in P_r(v) \\ u \in t(e)}} \omega_e(u) \forall u \in t(\bar{e})$$

Finally, the unified edge $\bar{e}$ is included in the relation r.

Neighborhoods and Crawling

Our goal is to classify an element based on information aggregated from its close neighbors in the graph. Here we describe what we mean by "close neighbors" and how we acquire the necessary data for classification.

Again following [1], we define the forward star of a node v∈ $\mathcal{V}$ and relational forward star of a node kind k∈ $\mathcal{K}$ as $$F_*(v)=\{e\in \varepsilon | s(e)=v\},$$

$$\tilde{F}_*(k)=\{r\in \mathcal{R} | k_s(r)=k\}, \quad (2)$$

respectively. The neighborhood of a node is then $$N(v) = \bigcup_{e \in F_*(v)} t(e). \quad (3)$$

We can now recursively define the series $$N_0(v) = \{v\}, \quad (4)$$

$$N_\ell(v) = \bigcup_{u \in N_{\ell-1}(v)} N(u) (\ell > 0)$$

each reaching further along the graph than its predecessor. We call $N_\ell(v)$ the set of $\ell$-neighbors of node v. We also define the $\ell$-neighborhood of v as $\mathcal{N}_\ell(v) = \bigcup_{i=0}^{\ell} N_i(v)$.

We set an integer parameter L>0, determining the furthest neighbor participating in the prediction for each element. We will see that this parameter corresponds to the number of layers used in the neural-network classifier. Given L, we require $\mathcal{N}_L(v)$ for each element v we want to classify.

We acquire the L-neighborhoods using a crawling procedure. We start from the elements in need of classification, which we call the seeds, and collect their £-neighbors sequentially: for each seed v, we first construct $N_o(v)$ and then for L=1, . . . , L use $\mathcal{N}_{\ell-1}(v)$ to find $\mathcal{N}_\ell(v)$.

As discussed in [2], it is advised to limit the size of the neighborhoods due to performance considerations. This can be achieved by e.g. uniformly sampling the target nodes of each edge when crawling the graph. To do so, we set a size limit $S_{max}=20$ and, whenever using Eq. (3), for every edge e satisfying $t(e)>S_{max}$. we use a uniform sample (without replacement) of only $S_{max}$ nodes from t(e). Other sampling schemes can of course be used, and the edge weights w can also be taken into consideration when sampling.

One example use of this classifier in the Cybereason platform is in cases in which the system encounters a file unknown to VT, but also detects connections from it to other elements which are found in VT. These neighbors are then used to classify the unknown file. This means that in this example, we actually have in our graph two different kinds of File elements: files found in VT, encountered as neighbors, and unknown files, encountered only in the Cybereason platform, acting as seeds requiring classification. We call the former node kind File and the latter FileSeed. As FileSeeds are unknown, their features are a small subset of File features. This means we are able to take File elements and, by removing some features, generate mock FileSeed elements from them, to use for training.[4]

[4]Similar procedures can be applied for other uses as well, such as classification of other element types, or classification of known elements.

Therefore, in this example, we apply our crawling procedure for acquiring the data differently, depending on whether we collect data for training the classifier, or at production time. During training, after deciding on a set of files suitable for training that will act as seeds, all known to VT, we crawl for their L-neighborhoods and convert the original seed elements to FileSeed kind. During production time, we have FileSeeds encountered by Cybereason, unknown to VT, and one or more neighbors of each. We then only crawl VT for the (L−1)-neighborhood of each neighbor to acquire all the data we need.

When training our classifier, we also require labels for the seed elements. Since, in our example, at training time our seeds are made from complete File elements known to VT, we can use all the available information to produce the labels. This can be done either manually by domain experts, or automatically using some logic operating on each VT File report. In the example given here we choose to classify to two classes (malicious' or 'benign'), but the method described below is generic and works for multi-class classification as well.

We stress that while classification of unknown files is the main example given in this work, our method can be used to classify other element kinds as well, even simultaneously with File elements. We can have seeds of several node kinds with no alteration to the formalism.

We have described how, for each seed v, we crawl for its neighbors $\mathcal{N}_L(v)$. required for its classification. Our classifier then has to be able to get as input an entire neighborhood, or in other words, the subgraph induced by $\mathcal{N}_L(v)$. This input is much richer than the traditional "feature vector" approach: The input consists of several feature vectors, one for each element in the neighborhood. The number of neighbors is not constant between samples, and they can be of different kinds (each element kind has its own set of features). We also have to provide a mapping of their connections, i.e. which element is related to which. The architecture suited for this task is the Graph Convolution Network.

Graph Convolution Network

As our classifier, we use the neural-network architecture known as Graph Convolution Network (GCN). It is suitable for our task since it operates on subgraphs as input. While other methods require an entire graph in order to produce classification to some of its nodes, using GCN we learn a set of weights used to aggregate information from neighborhoods. The same weights can then be used for new neighborhoods to classify new, yet unseen elements.

The following architecture is based on the GraphSAGE algorithm described in [2]. However, we have generalized it, as [2, 3] and others deal only with undirected graphs. In addition, approaches from [4] are incorporated in order to generalize the method to our typed and relational graph.

Graph Representation

Our typed graph of elements in which different node kinds have different features can be represented as follows: For each kind $k \in \mathcal{K}$ we arbitrarily assign indices to its elements as $k = \{v_1^k, \ldots, v_{|k|}^k\}$ We then build a feature matrix $X_k$ of dimensions $|k| \times f_K$, where $f_K$ is the number of features of kind k. In this matrix, row i holds the features of $v_i^k$.

In order to represent the connections between elements, we build for each relation $r \in \mathcal{R}$ an adjacency matrix $A_r$ of dimensions $\mathcal{K}_S(r) \mid \times \mid \mathcal{K}_S(r) \mid$. This is a sparse matrix in which the entry in row i and column j is non-zero if there is an $e \in r$ such that $v_j^{\mathcal{K}_S(r)} = \in t(e)$. In that case $(A_r)ij = w_e(v_i^{\mathcal{K}_t(r)})$.

Thus, with the $|\mathcal{K}|$ features matrices $\{X_k\}$ and. $|\mathcal{R}|$ adjacency matrices $\{A_r\}$, we can fully represent the graph. The only remaining piece of information we require is which of the elements in the graph function as seeds, i.e. which elements we are actually trying to classify. At training time, they are the only elements which have labels, and at inference time, they are the ones we need to classify. As mentioned above, in general several of the elements can function as seeds. There can even be seeds of several different node kinds.

Network Architecture

Much like a conventional neural network, the GCN is constructed in successive layers. Having chosen L and collected $\mathcal{N}_L(v)$ for each seed v, we require L layers in total. As mentioned above, this includes the furthermost neighbors that participate in the prediction for each seed. For example, if L=2, each seed receives information from, at most, its neighbors' neighbors.

Each layer of the network consists of two processing steps:
1. Aggregate information from the immediate neighbors of each node and use them to calculate additional features for it.
2. Feed all features (both original and aggregated from neighbors) into a fully-connected neural layer, one for each node kind.

In this way, at each iteration (layer), information flows along the edges of the graph a distance of one edge, in the direction opposite to that of the edge.

We note that each element's own features are always used when calculating its activations for the next layer. We should therefore never explicitly consider an element to be its own neighbor, in order not to give extra, unfair, weight to its own features. To avoid that, for each relation r connecting a node kind to itself, $\mathcal{K}_s(r) = \mathcal{K}_t(r)$, we set the diagonal of the corresponding adjacency matrix $A_r$ to zero.

We denote the activation matrix for node kind k in layer $\ell$ by $\mathbf{Z}_k^{(\ell)}$. Its dimensions are $|k| \times f_k^{(\ell)}$, where $f_k^{(\ell)}$ is the chosen number of units for kind k in this layer. We initially set $Z_k^{(0)} = X_k$ and $f_k^{(0)} = f_k$ for each $k \in \mathcal{K}$. The final number of units, $f_k^{(L)}$, is the number of output classes if there are seeds of kind k. Otherwise, $Z_k^{(L)}$ is never calculated (see below).

For each layer $\ell$ and each relation $r \in \mathcal{R}$, we need to choose an aggregation function, $AGG_r^\ell$. This function takes the features of the target nodes (i.e. neighbors) of relation r and aggregates them together for each source node, according to the adjacency matrix. The result is a feature matrix for neighbors, $$\mathbf{N}_r^{(\ell)} = AGG_r^{(\ell)}(\mathbf{Z}_{\mathcal{K}_t(r)}^{(\ell)}, A_r), \tag{5}$$

in which row i holds the aggregated features from the neighborhood of $v_i^{\mathcal{K}_s(r)}$. Its dimensions are $|\mathcal{K}_s(r)| \times n_r^{(\ell)}$ where $n_r^{(\ell)}$ is the number of resulting aggregated features. Below we discuss aggregation functions in greater detail.

We now use the original features in addition to the aggregated features and feed them all into a fully-connected neural layer. To do that, we define for each node kind k a kernel matrix $\mathbf{W}_k^{(\ell)}$ of dimensions $f_k^{(\ell)} \times f_k^{(\ell+1)}$ and a bias vector $\mathbf{b}_k^{(\ell)}$ of length $f_k^{(\ell+1)}$. We also define for each relation r a kernel matrix $\widetilde{\mathbf{W}}_r^{(\ell)}$ of dimensions. $n_r^{(\ell)} \times f_k^{(\ell+1)}$ The layer's output is then calculated as $$Z_k^{(\ell+1)} = \left( Z_k^{(\ell)} W_k^{(\ell)} + \sum_{r \in \tilde{r}*(k)} N_r^{(\ell)} \tilde{W}_r^{(\ell)} + b_k^{(\ell)} \right), \tag{6}$$

where σ is an activation function. Various activation functions can be used, for example, softmax[5] for the last layer and ReLU[6] for all other layers.

[5] The softmax function operates on vectors or, in our case, rows of a matrix and is defined as softmax $(x)_i = e^{x_i}/Z(X)$ with $Z(x) = \Sigma_j e^{x_j}$

[6] rectified linear unit function is defined as $\text{ReLU}(x) = \max(x, 0)$.

Finally, from the output matrices $\{Z_k^{(L)}\}$, we take only the rows corresponding to the seeds. This is the output of the network. We note that, actually, only output matrices for node kinds that can have seeds should ever be calculated. Other kinds are only used as neighbors. Therefore, for these node kinds, the calculation of the final $\{Z_k^{(L)}\}$, can be skipped.

Aggregation Functions

As discussed in [2], any function $\text{AGG}_r^{(\ell)}$ used to aggregate neighbors' features should, when viewed as operating on the neighbors of a single node, have the following properties:

Variadic: The function can operate on any number of neighbors.
Order agnostic: Invariant to permutations of the inputs.
Trainable: While not a must, if needed we can train weights for the function.
Expressive: The function has high representational capacity and aggregates the neighbors' features in a meaningful way.

The first two properties simply imply that the function operates on a set. In general, any function with these properties can serve as an aggregation function. However, we obviously prefer ones that are more expressive, while maintaining simplicity, i.e. having few weights to train.

Here we consider as examples two aggregation functions: mean and max pooling. The former is an example of a very simple aggregator and the latter a more complex one that is more expressive.

Mean Aggregation

This simple aggregation function has no trainable weights. It calculates the weighted mean of each feature over all neighbors. As such, the number of features remains unchanged, i.e. $n_r^{(\ell)} \times f_{kt(r)}^{(\ell)}$ We use the adjacency matrix $A_r$, to build its out-degree matrix $\acute{D}_r$, a diagonal matrix of dimensions $|\mathcal{K}_s(r)| \times |\mathcal{K}_s(r)|$ satisfying, $(\acute{D}_r)_{i,j} = \delta_{ij} \Sigma_k (A_r)_{ik}$, where $\delta_{ij}$ is the Kronecker delta. The aggregated feature matrix is then given by $$N_r^{(\ell)} = \acute{D}_r^{-1} A_r Z_{k_r(t)}^{(\ell)} \quad (7)$$

For efficiency, the matrix $\acute{D}_r^{-1} A_r$ can of course be calculated only once, in advance.

Other normalizations can of course be considered. For example, motivated by the symmetric normalized Laplacian operator, a variation of mean aggregation is considered by [3]. In it, the in-degree matrix $\grave{D}_r$, satisfying $(\grave{D}_r)_{ij} = \delta_{ij} \Sigma_k (A_r)_{kj}$, is also utilized and the aggregated feature matrix is calculated as $$N_r^{(\ell)} = \acute{D}_r^{-1/2} A_r \grave{D}_r^{-1/2} Z_{K_t(r)}^{(\ell)}. \quad (8)$$

While similar, the two aggregators weigh the features differently.

The main advantage of the mean aggregator is its simplicity. There are no weights to train and the logic is straightforward. It is, however, not very expressive: for each feature, all neighbors contribute according to their edge weights. Many neighbors must exhibit extreme values before the effect is evident in the aggregated feature.

Max Pooling Aggregation

A more sophisticated aggregation function uses max pooling. In a sense, it picks out the most extreme evidence from all features, over all neighbors. The neighbors' features are first fed into a fully-connected neural layer, possibly changing the number of features in the process. For each output feature, the maximum over all neighbors is then selected.

In the most general form of this aggregator, we select a pooling dimension $p_r^{(\ell)}$ for each relation r, and define a pooling kernel matrix $\widehat{W}_r^{(\ell)}$ of dimensions $f_{kt(r)}^{(\ell)} \times p_r^{(\ell)}$ and a pooling bias vector $\hat{b}_r^{(\ell)}$ of length $p_r^{(\ell)}$. These would both be trained with the rest of the network weights. The aggregated feature matrix is then given by $$N_r^{(\ell)} = A_r \odot \sigma(Z_{\mathcal{K}_t(r)}^{(\ell)} \widehat{W}_r^{(\ell)} + \hat{b}_r^{(\ell)})). \quad (9)$$

where $\sigma$ is an activation function such as ReLU and we define the operator $\odot$ as $$(A \odot B)_{ij} \equiv \max_k \{A_{ik} B_{kj}\} \quad (10)$$

i.e. similar to the regular dot product, but where one takes the maximum instead of summing. The resulting number of aggregated features is then $n_r^{(\ell)} = p_r^{(\ell)}$.

In practice, we have found it preferable to share the pooling weights between all relations having the same target node kind. The motivation for sharing weights is to reduce the complexity of the aggregator, and thus reduce overfitting. Moreover, it makes sense that the means to aggregate features of a certain kind should not depend strongly on the use of these aggregated features later on. In fact, this argument can be applied to any aggregation function which uses trained weights. While the general formalism allows for different weights for each relation, it is often advantageous to share weights in this manner.

In the version of max pooling incorporating shared weights, we only have a pooling dimension $p_k^{(\ell)}$ defined for each kind $k \in \kappa$, and similarly a kernel matrix $\widehat{W}_k^{(\ell)}$ and a bias vector $\hat{b}_k^{(\ell)}$. The aggregated matrix is now $$N_r^{(\ell)} = A_r \odot \sigma(Z_{\mathcal{K}_t(r)}^{(\ell)} \widehat{W}_{\mathcal{K}_t(r)}^{(\ell)} + \hat{b}_{\mathcal{K}_t(r)}^{(\ell)}), \quad (11)$$

and the number of aggregated features is $n_r^{(\ell)} = p_{kt(r)}^{(\ell)}$.

We can see that the max pooling aggregator is not as simple as the mean aggregator and contains trainable weights. However, it is much more expressive. It is designed to be sensitive to extreme neighbors by taking the maximum over them. The fully-connected neural layer also allows for great flexibility, as combinations of features can also be considered, different features can be given different relative weights and, by flipping the signs, the maximum function can effectively be changed to a minimum. While other, more complicated functions can also be considered, we have found the max pooling aggregator to perform very well and strike a good balance between simplicity and expressiveness.

Training the Network

Having provided a label for each seed, we can train the GCN using standard stochastic gradient descent. We can use any standard loss function such as categorical cross-entropy, and employ standard practices like dropout and regularization.

Notably, the way we have described the GCN architecture allows for mini-batch training without any special adaptation. After selecting a mini-batch of seeds $B \subset v$ for training, we crawl for all their L-neighborhoods, $$\tilde{\mathcal{N}}_L(B) = \bigcup_{v \in B} \mathcal{N}_L(v), \quad (12)$$

and build the subgraph induced by $\tilde{\mathcal{N}}_L(B)$. Effectively, this means selecting only the rows of the feature matrices $\{X_k\}$ and rows and columns of the adjacency matrices $\{A_r\}$ corresponding to nodes in $\tilde{\mathcal{N}}_L(B)$. These reduced matrices are then fed into the network in the same manner described above.

Using the Network Output

The outputs of the GCN are the matrices $Z_k^{(L)}$, one for each kind k which has seed elements. In our example, we are interested in classifying File elements, so we take as output the matrix corresponding to the File kind. Furthermore, we take only its rows corresponding to our seed elements, the ones we are interested in classifying. Its number of columns, $f_k^{(L)}$, is the number of possible output classes of our classifier. If a trait to be inferred is continuous, it is represented by a single "class". If discrete, the simplest case is of a binary classifier, having two output classes, e.g., benign and malicious.

The procedure for determining the class of each classified element is standard, as for most classifiers based on a neural network. In case of a continuous regressor, depending on the choice of activation function, the output value can simply be the inferred maliciousness level. In case of a discrete classifier, assuming the activation function a used for the last layer was chosen to be softmax, the values in each row are non-negative, and their sum is 1. We can therefore interpret them as the probabilities for the sample to belong to the various classes. The network is trained to provide this meaning to the values: As is standard practice, the training labels are encoded prior to training using "one-hot" encoding,[7] i.e. the class $C_m$, is encoded as the vector $X_i = \delta_{i,m}$, assigning 100% probability to the class $C_m$, and zero probability to all others.

[7] See e.g.https://en.wikipedia.org/wiki/One-hot

Having the class probabilities for our newly classified samples, we can simply choose for each sample the class with the highest probability. Alternatively, a more sophisticated scheme can be implemented, in which we have a threshold of minimal probability for a class, and we allow this class to be chosen only if its probability is above the threshold. In this case, we must also assign a default class, reported in case the probability for no other class is above their threshold. These thresholds can be calibrated on a test set, e.g., by requiring a certain value of precision, recall or some other metric.

In any case, once a class has been determined for a sample, its probability can be considered the class "score", or confidence level, and reported along with the chosen class. Any system using the results of the classifier can then use this reported level to determine the severity of the classification. For example, in a binary file classifier capable of reporting either malicious or benign for each file, this score (i.e., probability) can determine whether an alert is raised, some automatic remediation performed, or some other action taken.

Security Impact on the Cybereason Platform

The Cybereason platform acts as a complex graph of elements and events, in which any new piece of information triggers a decision-making process in every element affected by it, directly or indirectly.

The system manages a wide variety of information types for every element. One prominent type of information is reputation indications gathered from external sources. This type of information is extremely impactful for decision making processes, since external information typically has the potential to give a broader context than what can be observed in the context of some specific detection scenario. As a result, many important techniques for providing security value rely on external reputation, such as detecting malicious elements or identifying properties of observed threats. This property is common to most advanced cybersecurity solutions.

One major drawback of using external reputation sources is that they require the relevant elements to have been observed beforehand. This is especially true in the common case where the element being analyzed cannot be exported for examination, due to timing constraints, privacy issues or other reasons. In these cases, the element is considered "unknown", which can, in and of itself, be a valid indication, albeit a considerably less useful one than, say, "malicious" or "benign".

The graph-based classifier described here provides an additional, novel, source of external reputation for various elements. For example, in the important case of files, it allows the classification of unknown files (i.e., never before seen in an external source such as VirusTotal), for which relations have been observed in the Cybereason platform to other elements which are known to the external source. Using this new classifier, we now have indirect reputation for these files, in the form of the output of the classifier—effectively making many "unknown" cases into "known". This reputation can include a classification such as "malicious" or "benign", an indication of the kind of threat, and so on, together with a confidence score that can further be used to make higher-level security decisions. This indirect reputation is now added as metadata to the element, in a similar way as is done with direct sources of external reputation for "known" elements. Notably, the classifier can provide reputation for elements for which we otherwise would not have any.

Furthermore, the same process can be used even on known elements, to provide an additional level of external information, one that combines the externally observed reputation of individual elements with their locally observed relations. An example would be an element whose external reputation provides only a marginal indication of maliciousness, not enough to convict it as a threat. However, observing it communicate with another element with marginal reputation, the graph classifier can potentially provide an aggregated, indirect, indication of maliciousness which is now enough to convict the sample.

Finally, the reputation indications provided by the graph-based classifier join all other collected data in the decision-making process constantly taking place within the Cybereason platform. More specifically, based on the result, alerts can be raised, customers notified, or any other action taken. Consequently, this novel classifier enriches the Cybereason platform and significantly expands its capabilities in handling different kinds of cybersecurity scenarios.

Thus, the Cybereason platform, acting as a profiler, determines a maliciousness level profile for the element based on aggregation of nodes and edges in the hypergraph. It then links information generated relating to the element and the maliciousness level profile for the element to various databases, including VT, and to the network. For example, for an incriminated file one or more actions can be taken, such as isolating a machine that received the file, killing processes started by the file, removing persistence of the file on the network or affected computer, cleaning infected samples, modifying risk assessment for computer or network, generating a report, collecting additional artifacts, triggering a search for related elements, blocking a user from taking actions and sending information to other IT or security systems. For other element types, some of the above actions are applicable as well. In addition, there are also other actions specific to particular element types, e.g. blocking an IP address or a web domain from network access, restricting user authorization, blocking access to an external device, shutting down computers, erasing memory devices, filtering e-mail messages, and many more.[8]

[8]See http://www.cybereason.com/.

Figure 1:
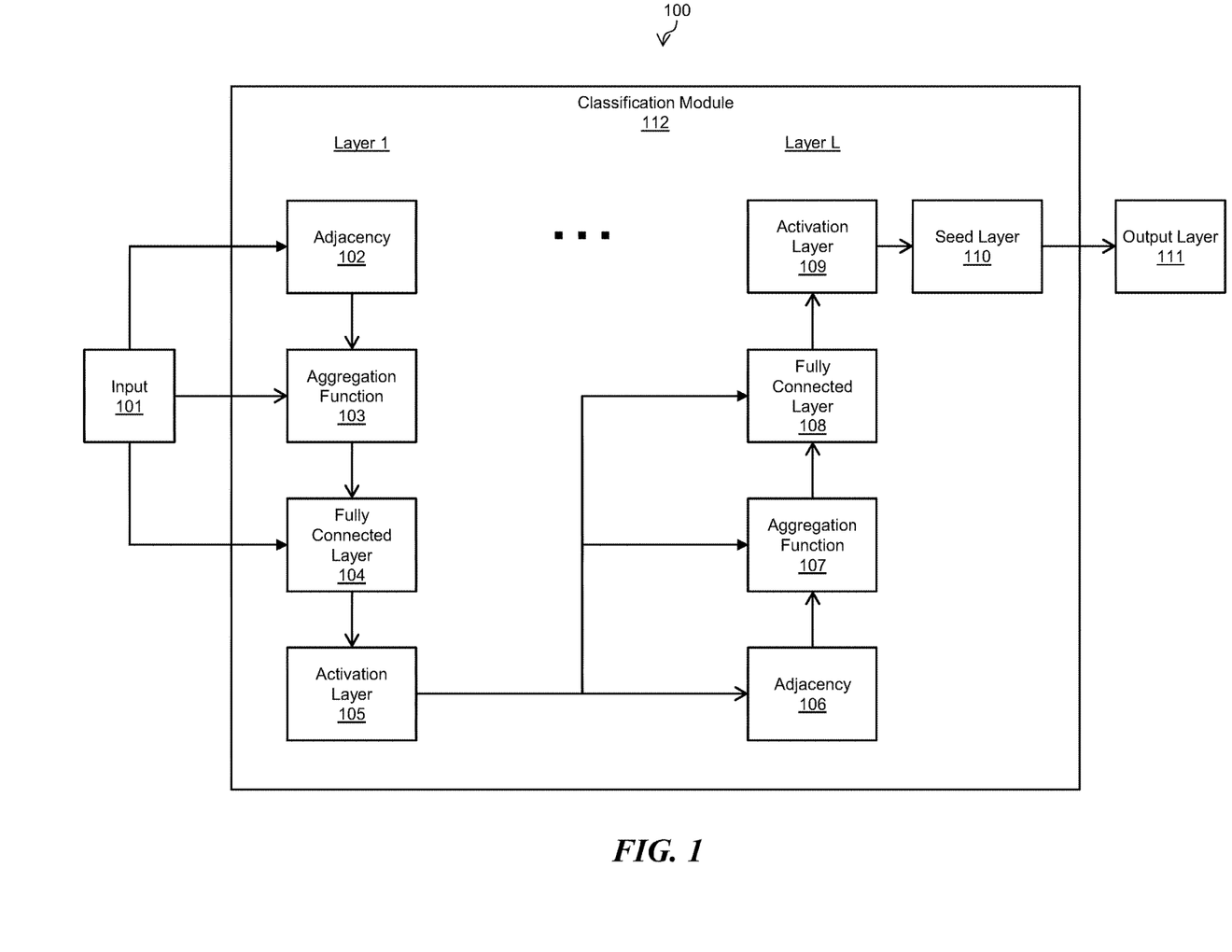
FIG. 1 is an example architecture for a graph neural network, according to some embodiments of the present disclosure.

FIG. 1 is an example architecture 100 for a graph neural network, according to some embodiments of the present disclosure. The architecture 100 can include a classification module 112, which can include up to L layers. In addition, The architecture 100 can include an input 101 to a first layer. The input 101 can connect to an adjacency box 102, an aggregation function 103, and a fully connected layer 104. Further, the adjacency box 102 connects to the aggregation function 103, which connects to the fully connected layer 104. The activation layer 105 can be connected to another layer L. The activation layer 105 can connect to an adjacency box 106, an aggregation function 107, and a fully connected layer 108. The adjacency box 106 is connected to an aggregation function 107, which is connected to the fully connected layer 108. The fully connected layer 108 is connected to an activation layer 109, which is connected to a seed layer 110 and then to an output 111.

Figure 2:
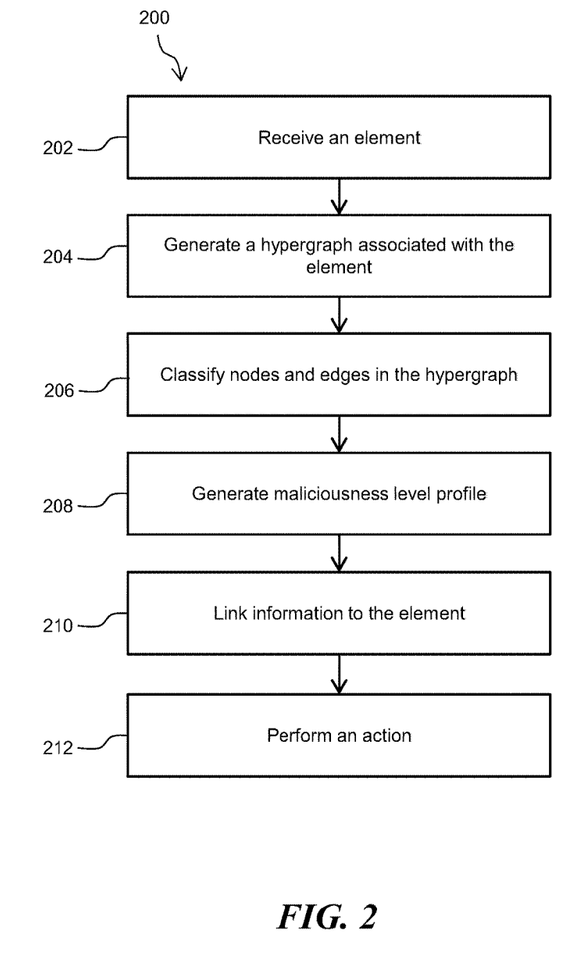
FIG. 2 is an example process for classifying an element and performing an action according to some embodiments of the present disclosure.

FIG. 2 is an example process 200 for classifying an element and performing an action according to some embodiments of the present disclosure. At block 202, the process includes receiving an element, such as from a user device. In some embodiments, this can be as a result of scanning various user devices and obtaining an element based on some user-defined criteria. At block 204, the process includes generating a hypergraph associated with the element. In some embodiments, this can include performing a crawling procedure to generate a neighborhood for the element as described herein.

At block 206, the process includes classifying the nodes and edges in the hypergraph. In some embodiments, this can include feeding the generated hypergraph into a graph neural network, such as the one described in FIG. 1. The output of the neural network would thus be a classification of the nodes and edges in the hypergraph. At block 208, the process includes generating a maliciousness level profile for the received element and, at 210, linking information to the element in a local database. At block 212, the process includes determining and performing an appropriate action to take based on the element type and the classification of block.

Figure 3:
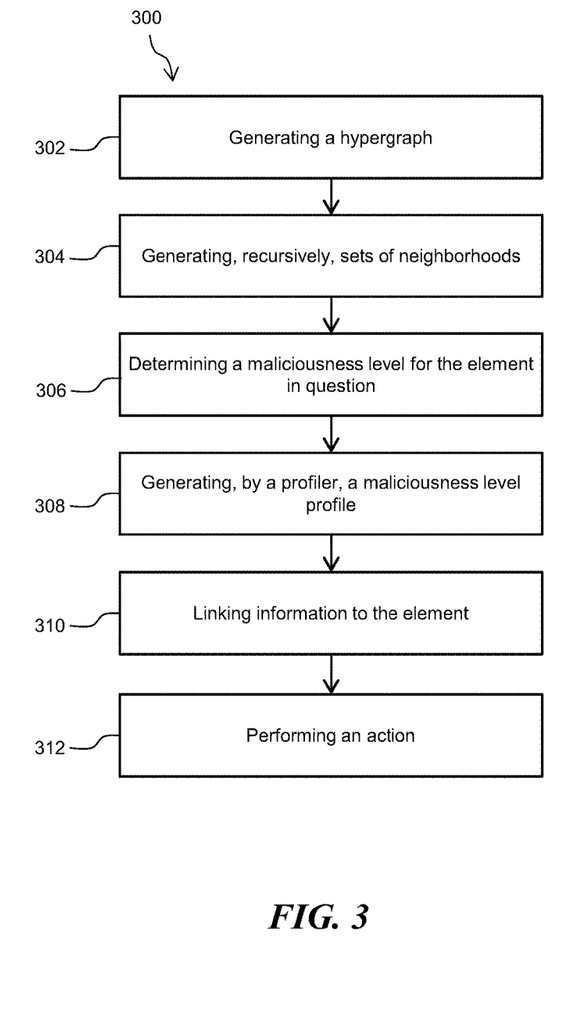
FIG. 3 is another example process for classifying an element and performing an action according to some embodiments of the present disclosure.

FIG. 3 is another example process 300 for classifying an element and performing an action according to some embodiments of the present disclosure. At block 302, the process includes generating a hypergraph of nodes, edges, and neighboring elements by crawling. At block 304, the process includes generating recursively sets of neighborhoods of the element in question from the hypergraph. At block 306, the process includes determining a maliciousness level for the element in question by analyzing the sets of neighborhoods with a trained neural network, wherein each layer of the neural network includes two processing steps. The two steps include aggregating information from immediate neighbors of each node and using them to calculate additional features for said node; and feeding all features (both original and aggregated from neighbors) into a fully-connected neural layer, one for each node kind.

At block 308, the process includes generating by a profiler a maliciousness level profile for said element in question. At block 310, the process includes linking information generated by the profiler relating to the element in question and the maliciousness level profile for the element. At block 312, the process includes responding by taking an action or actions such as isolating a machine that received the file, killing processes started by the file, removing persistence of the file on a network or affected computer, cleaning infected samples, modifying risk assessment for computer or network, generating a report, collecting additional artifacts, triggering a search for related elements, blocking a user from taking actions and sending information to other IT or security systems, or for other element types, any of the above actions as applicable, and in addition, other actions specific to particular element types, such as blocking an IP address or a web domain from network access, restricting user authorization, blocking access to an external device, shutting down computers, erasing memory devices, filtering e-mail messages, and many more.

REFERENCES

[1] G. Gallo, G. Longo, S. Pallottino, and S. Nguyen, "Directed hypergraphs and applications," *Discrete Applied Mathematics*, vol. 42, no. 2, pp. 177-201, 1993.
[2] W. L. Hamilton, R. Ying, and J. Leskovec, "Inductive Representation Learning on Large Graphs," *ArXiv e-prints*, June 2017.
[3] T. N. Kipf and M. Welling, "Semi-supervised classification with graph convolutional networks," *CoRR, vol. abs/1609.02907*, 2016.
[4] M. Schlichtkrull, T. N. Kipf, P. Bloem, R. van den Berg, I. Titov, and M. Welling, "Modeling Relational Data with Graph Convolutional Networks," *ArXiv e-prints*, March 2017.

The invention claimed is:

1. A method of classifying an element in question comprising:
   generating a hypergraph of nodes, edges and neighboring elements by crawling;
   generating recursively sets of neighborhoods of the element in question from the hypergraph;
   determining a maliciousness level for the element in question by analyzing the sets of neighborhoods with a trained neural network, wherein each layer of the neural network includes two processing steps:
   (a) aggregating information from immediate neighbors of each node and using them to calculate additional features for said node;
   (b) feeding all features (both original and aggregated from neighbors) into a fully-connected neural layer, one for each node kind;
   generating by a profiler a maliciousness level profile for said element in question;
   linking information generated by the profiler relating to the element in question and the maliciousness level profile for the element and, for an incriminated file, responding by taking an action or actions such as isolating a machine that received the file, killing processes started by the file, removing persistence of the file on a network or affected computer, cleaning infected samples, modifying risk assessment for computer or network, generating a report, collecting additional artifacts, triggering a search for related elements, blocking a user from taking actions and sending information to other IT or security systems; or for other element types, any of the above actions as applicable, and in addition, other actions specific to particular element types, e.g. blocking an IP address or a web domain from network access, restricting user authorization, blocking access to an external device, shutting down computers, erasing memory devices, filtering e-mail messages, and many more.

2. The method of claim 1, further comprising an aggregation function, the aggregation function picking out most extreme evidence from all features over all neighbors.

3. The method of claim 2, wherein neighbors' features are fed into a fully-connected neural layer, and then a maximum over all neighbors is selected.

4. The method of claim 1, wherein the data base is VirusTotal (VT).

5. The method of claim 1, wherein nodes are typed, and nodes of different types may have different features.

6. The method of claim 1, wherein the hypergraph has only a single source node for each edge.

7. The method of claim 1, wherein each edge is mapped to a set of target nodes.

8. The method of claim 1, wherein the neural network is trained by providing a set of seed nodes, crawling for a set of the seed nodes' neighborhoods, building a subgraph from the set of the seed nodes' neighborhoods, and training the neural network by feeding the subgraph to the neural network.

9. A method of determining a maliciousness level of an element in question using a hypergraph of neighbors, the method comprising:
receiving an element of unknown maliciousness level;
generating a hypergraph of neighbor target elements found in the local system, a remote data-base, several remote data-bases or a combination of such systems, the hypergraph containing a set of nodes and a set of edges, wherein the nodes represent the neighbor target elements, and the edges represent connections between the neighbor target elements;
classifying nodes and edges in the hypergraph;
generating by a profiler a maliciousness level profile for the element based on aggregation of nodes and edges in the hypergraph;
linking information generated by the profiler relating to the element in question and the maliciousness level profile for the element and, for an in-criminated file, responding by taking an action or actions such as isolating a machine that received the file, killing processes started by the file, removing persistence of the file on a network or affected computer, cleaning infected samples, modifying risk assessment for computer or network, generating a report, collecting additional artifacts, triggering a search for related elements, blocking a user from taking actions and sending information to other IT or security systems; or for other element types, any of the above actions as applicable, and in addition, other actions specific to particular element types, e.g. blocking an IP address or a web domain from network access, restricting user authorization, blocking access to an external device, shutting down computers, erasing memory devices, filtering e-mail messages, and many more.

10. The method of claim 9, wherein there are from 1 to V target nodes associated with each edge, where V is the number of nodes in the hypergraph.

11. The method of claim 9, wherein the hypergraph has only a single source node for each edge.

12. The method of claim 9, wherein the hypergraph contains at least some edges having multiple source nodes.

13. The method of claim 9, wherein the input data is a hybrid hypergraph comprising of combined data collected locally and data from one or more external data bases (such as VT).

14. The method of claim 9, wherein the element in question is of known maliciousness level.

15. The method of claim 9, wherein nodes are typed, and nodes of different types may have different features.

16. The method of claim 9, wherein sets of neighborhoods of target nodes are generated recursively based on nodes satisfying particular features.

17. The method of claim 9, wherein the hypergraph is generated by crawling.

18. The method of claim 9, wherein a set of seed nodes in the hypergraph is classified by a trained neural network.

19. The method of claim 9, wherein an element may be classified based on its connections to neighbors without a classification of said neighbors.

20. The method of claim 9, wherein the searching is in VirusTotal (VT).

* * * * *

UNITED STATES PATENT AND TRADEMARK OFFICE
CERTIFICATE OF CORRECTION

| | | |
|---|---|---|
| PATENT NO. | : 11,777,985 B2 | Page 1 of 1 |
| APPLICATION NO. | : 17/065362 | |
| DATED | : October 3, 2023 | |
| INVENTOR(S) | : Assaf Ben-David et al. | |

It is certified that error appears in the above-identified patent and that said Letters Patent is hereby corrected as shown below:

On the Title Page

Item (12), should read: Ben-David et al.

Item (72), add - Yonatan Perry, Neve Yarak (IL) -

Signed and Sealed this
Fifteenth Day of October, 2024

*Katherine Kelly Vidal*

Katherine Kelly Vidal
*Director of the United States Patent and Trademark Office*